United States Patent
Reilly, Jr. et al.

(10) Patent No.: US 10,138,334 B2
(45) Date of Patent: Nov. 27, 2018

(54) DRY WATER SOLUBLE POLYMER PARTICLES

(71) Applicant: Water Mark Technologies, Inc., Lake Hopatcong, NJ (US)

(72) Inventors: Phillip B. Reilly, Jr., Andover, NJ (US); Kimberly S. Logsdon, Chatham, NJ (US); Phillip B. Reilly, III, Mendham, NJ (US)

(73) Assignee: Water Mark Technologies, Inc., Lake Hopatcong, NJ (US)

( * ) Notice: Subject to any disclaimer, the term of this patent is extended or adjusted under 35 U.S.C. 154(b) by 0 days.

(21) Appl. No.: 14/741,000

(22) Filed: Jun. 16, 2015

(65) Prior Publication Data

US 2016/0369068 A1 Dec. 22, 2016

(51) Int. Cl.
| | |
|---|---|
| *E21B 43/26* | (2006.01) |
| *C09K 8/68* | (2006.01) |
| *C08J 3/20* | (2006.01) |
| *C01F 7/47* | (2006.01) |
| *C08J 3/12* | (2006.01) |
| *C08K 3/16* | (2006.01) |
| *C08K 5/098* | (2006.01) |
| *C08K 3/26* | (2006.01) |
| *C09K 8/80* | (2006.01) |
| *C02F 11/14* | (2006.01) |
| *C01F 7/06* | (2006.01) |

(52) U.S. Cl.
CPC .......... *C08J 3/203* (2013.01); *C01F 7/066* (2013.01); *C01F 7/47* (2013.01); *C02F 11/14* (2013.01); *C08J 3/12* (2013.01); *C08K 3/16* (2013.01); *C08K 3/26* (2013.01); *C08K 5/098* (2013.01); *C09K 8/68* (2013.01); *C09K 8/80* (2013.01); *C08J 2333/02* (2013.01); *C08J 2333/26* (2013.01); *C08K 2003/162* (2013.01); *C08K 2003/262* (2013.01)

(58) Field of Classification Search
None
See application file for complete search history.

(56) References Cited

U.S. PATENT DOCUMENTS

| | | | |
|---|---|---|---|
| 2,982,749 A | 5/1961 | Friedrich et al. | |
| 3,275,250 A | 9/1966 | Plunguian | |
| 3,435,618 A | 4/1969 | Katzer | |
| 3,841,402 A * | 10/1974 | Knight | C09K 8/5083 166/247 |
| 4,051,065 A | 9/1977 | Venema | |
| 4,413,087 A | 11/1983 | Bernot | |
| 4,637,418 A * | 1/1987 | Karl | C10L 1/32 137/13 |
| 4,755,206 A | 7/1988 | Clark | |
| 5,379,947 A | 1/1995 | Williams et al. | |
| 5,863,302 A | 1/1999 | Carey et al. | |
| 5,947,596 A | 9/1999 | Dowd | |
| 8,661,729 B2 * | 3/2014 | Hendrickson | C09K 8/68 47/58.1 SC |
| 8,916,508 B2 * | 12/2014 | Parnell | C09K 8/604 507/211 |
| 2003/0060586 A1 | 3/2003 | Whipple et al. | |
| 2005/0145552 A1 | 7/2005 | Sheets | |
| 2005/0241996 A1 | 11/2005 | Garcia et al. | |
| 2011/0245114 A1 * | 10/2011 | Gupta | C09K 8/524 507/225 |
| 2012/0157356 A1 * | 6/2012 | Dawson | C09K 8/602 507/219 |
| 2013/0324443 A1 * | 12/2013 | Wang | C04B 24/163 507/121 |
| 2014/0051610 A1 * | 2/2014 | Perry | C09K 8/68 507/226 |

FOREIGN PATENT DOCUMENTS

| | | |
|---|---|---|
| CA | 1204537 A1 | 5/1986 |
| CN | 102108003 A | 6/2011 |
| EP | 0303447 A2 | 2/1989 |
| WO | 2006050979 A1 | 5/2006 |
| WO | 2011003068 A1 | 1/2011 |

OTHER PUBLICATIONS

"Zeolite," Wikipedia, retrieved Jul. 26, 2016 from https://en.wikipedia.org/wiki/Zeolite#Artificial_synthesis.*
International Search Report for Application No. PCT/US16/037859 dated Dec. 5, 2016.

* cited by examiner

*Primary Examiner* — Angela M DiTrani
(74) *Attorney, Agent, or Firm* — Lerner, David, Littenberg, Krumholz & Mentlik, LLP

(57) ABSTRACT

Methods are provided for reducing friction during fracturing of a subterranean formation. In some embodiments, a method includes introducing micronized dry water soluble polymer (DWSP) particles into a fracturing liquid to form a mixture; and pumping the mixture into a subterranean formation to fracture the subterranean formation, the micronized DWSP particles include a DWSP, DWSP is selected from the group consisting of dry anionic, dry cationic, dry nonionic water soluble polymer, and mixtures thereof, mean particle size of the micronized DWSP particles ranges from about 115 to about 225 microns.

24 Claims, No Drawings

DRY WATER SOLUBLE POLYMER PARTICLES

FIELD OF THE INVENTION

Micronized dry water soluble polymer (DWSP) particles, methods of making the same, and applications therewith are disclosed herein.

BACKGROUND OF THE INVENTION

Dry water soluble polymers (DWSPs) have been in the marketplace for many years. For example, DWSPs may include dry polyelectrolytes, starches and polysaccharides, among others. Exemplary polyelectrolytes can include anionic, cationic, or nonionic polyelectrolytes. The DWSPs can be high molecular weight, such as ranging from about 200,000 to 20,000,000 g/mol. Typically, DWSPs are dissolved in water for applications such as water clarification, waste water clarification, sludge dewatering, retention aids in the paper process, tailings clarification in the mining industry, and friction reduction in the oil and gas industry, among other applications.

The hydroscopic nature of the DWSPs cause the DWSPs to agglomerate when water is added, making the DWSPs difficult to disperse and dissolve. In addition, aqueous solutions ranging from about 0.1 wt % to about 1.0 wt % DWSPs are difficult to make because DWSPs can form a viscous solution in water. Viscosities of this solution can range from about 500 to 3,000 centipoise, or greater than 3,000 centipoise.

Generally, the water used to make solution of DWSPs is fresh water, i.e., water that is low in dissolved solids (about 2,000 mg/l or less) and substantially free of suspended solids. In contrast, when a brine solution is used, the brine solution can inhibit the DWSPs from uncoiling and dissolving. The mixing time for the DWSPs to dissolve in fresh water ranges from about 30 minutes to more than an hour.

Unfortunately, these mixing times make conventional DWSPs undesirable for many applications. For example, liquid emulsions, which include oil, concentrated polyelectrolyte solution in water, and a surfactant, are more expensive than conventional DWSPs products, but the polymers in a liquid emulsions can be dissolved in minutes compared to the mixing times required in conventional DWSPs.

Accordingly, improved DWSPs are provided herein.

BRIEF SUMMARY OF THE INVENTION

In some embodiments, a method of forming a micronized dry water soluble polymer particles includes reducing a particle size of dry water soluble polymer (DWSP) particles; and forming micronized DWSP particles by mixing an additive with the DWSP particles at least one of prior to, during, or after the reduction of the particle size of the DWSP particles. In some embodiments, the DWSP is selected from the group consisting of a dry anionic, a dry cationic, a dry nonionic water soluble polymer, and mixtures thereof. In some embodiments, the additive is selected from the group consisting of an inorganic oxide, an inorganic hydroxide, an inorganic salt, an organic salt, an insoluble water absorbing material, and mixtures thereof. In some embodiments, a mean particle size of the micronized DWSP particles ranges from about 1 to about 300 microns. In some embodiments, an amount of the DWSP ranges from about 40 wt % to about 95 wt % of the micronized DWSP particles.

In some embodiments, an amount of additive ranges from about 5 wt % to about 60 wt % of the micronized DWSP particles.

In some embodiments, the reduction of the particle size of the DWSP particles is performed by an air clarifying milling system.

In some embodiments, the reduction of the particle size of the DWSP particles is performed by an air swept hammer milling system.

In some embodiments, the reduction of the particle size of the DWSP particles is performed by a jet milling system.

In some embodiments, the reduction of the particle size of the DWSP particles is performed by a ball milling system.

In some embodiments, the method further includes forming the dry water soluble polymer by polymerization of an acrylamide monomer, wherein an amount of acrylamide present in the water soluble polymer ranges from about 5 to about 100 mole percent.

In some embodiments, the method further includes forming the water soluble polymer by polymerization of a dimethyl amino ethyl acrylate methyl chloride quat monomer, wherein an amount of dimethyl amino ethyl acrylate methyl chloride quat present in the polymer ranges from about 5 to about 100 mole percent.

In some embodiments, further includes forming the water soluble polymer by polymerization of an acrylic acid or an acrylic acid salt, wherein the acrylic acid salt includes a counter ion selected from the group consisting of sodium, potassium, and ammonium, and mixtures thereof, and wherein an amount of acrylic acid or acrylic acid salt present in the polymer ranges from about 2 to about 100 mole percent.

In some embodiments, the method further includes forming the water soluble polymer by polymerization of ammonium methacrylate: 2-acrylamido-2-methylpropanesulfonic acid (AMPS) or an AMPS salt, wherein the AMPS salt includes a counter ion selected from the group consisting of sodium, potassium, ammonium, and mixtures thereof, and wherein an amount of AMPS or AMPS salt present in the polymer ranges from about 2 to about 100 mole percent.

In some embodiments, the inorganic oxide is selected from the group consisting of calcium oxide, magnesium oxide, dolomite (CaO×MgO), and mixtures thereof, and wherein the inorganic salt is selected from the group consisting of calcium chloride, magnesium chloride, and mixtures thereof.

In some embodiments, the organic salt is selected from the group consisting of citrates, carbonates, bicarbonates, and mixtures thereof.

In some embodiments, the insoluble water absorbing material is selected from the group consisting of silica gel, silica, alumina, and mixtures thereof.

In some embodiments, the insoluble water absorbing material is selected from the group consisting of natural, synthetic zeolite, and mixtures thereof.

In some embodiments, a method of fracturing a subterranean formation includes introducing micronized dry water soluble polymer (DWSP) particles into a fracturing liquid to form a mixture; and pumping the mixture into a subterranean formation to fracture the subterranean formation. In some embodiments, the micronized DWSP particles include a DWSP and an additive. In some embodiments, the DWSP is selected from the group consisting of a dry anionic, a dry cationic, a dry nonionic water soluble polymer, and mixtures thereof. In some embodiments, the additive is selected from the group consisting of an inorganic oxide, an inorganic hydroxide, an inorganic salt, an organic salt, an insoluble water absorbing material, and mixtures thereof. In some embodiments, a mean particle size of the micronized DWSP particles ranges from about 1 to about 300 microns. In some embodiments, an amount of the DWSP ranges from about 40 wt % to about 95 wt % of the micronized DWSP particles. In some embodiments, an amount of the additive ranges from about 5 wt % to about 60 wt % of the micronized DWSP particles.

In some embodiments, prior to introducing the micronized DWSP particles into the fracturing liquid, the method includes at least one of dissolving or dispersing the micronized DWSP particles in a first liquid.

In some embodiments, the first liquid is selected from the group consisting of water, brine, liquid $CO_2$, an alcohol, a glycol, an oil, and mixtures thereof.

In some embodiments, the brine has a concentration ranging from about 2000 mg/l to at least about 350,000 mg/l.

In some embodiments, the fracturing liquid includes at least one of water, brine, or liquid $CO_2$, and the method includes introducing a proppant into the mixture.

In some embodiments, the brine has a concentration ranging from about 2000 mg/l to at least about 350,000 mg/l.

In some embodiments, the mean particle size of the micronized DWSP particles ranges from about 50 microns to about 200 microns.

In some embodiments, a method of dewatering sludge includes introducing micronized dry water soluble polymer (DWSP) particles into a sludge, wherein the sludge includes water and solids; separating water of the sludge from solids of the sludge using the micronized DWSP particles; and collecting a wet solid including water and solids of the sludge, wherein a concentration of solids in the wet solid is higher than a concentration of solids in the sludge. In some embodiments, the micronized DWSP particles includes a DWSP and an additive. In some embodiments, the DWSP is selected from the group consisting of a dry anionic, a dry cationic, a dry nonionic water soluble polymer, and mixtures thereof. In some embodiments, the additive is selected from the group consisting of an inorganic oxide, an inorganic hydroxide, an inorganic salt, an organic salt, an insoluble water absorbing material, and mixtures thereof. In some embodiments, a mean particle size of the micronized DWSP particles ranges from about 1 to about 300 microns. In some embodiments, an amount of the DWSP ranges from about 40 wt % to about 95 wt % of the micronized DWSP particles. In some embodiments, an amount of the additive ranges from about 5 wt % to about 60 wt % of the micronized DWSP particles.

In some embodiments, prior to introducing the micronized DWSPs into the sludge, the method includes at least one of dissolving or dispersing the micronized DWSP particles in a first liquid.

In some embodiments, the first liquid is selected from the group consisting of water, brine, an alcohol, a glycol, an oil, and mixtures thereof.

In some embodiments, a method of recovering a component from a waste material includes introducing micronized dry water soluble polymer (DWSP) particles into a waste material, wherein the waste material includes insoluble solids and a component; and separating the component from the insoluble solids of the waste material using the micronized DWSP particles; and recovering the separated component. In some embodiments, the micronized DWSP particles includes a DWSP and an additive. In some embodiments, the DWSP is selected from the group consisting of a dry anionic, a dry cationic, a dry nonionic water soluble polymer, and mixtures thereof. In some embodiments, the additive is selected from the group consisting of an inorganic oxide, an inorganic hydroxide, an inorganic salt, an organic salt, an insoluble water absorbing material, and mixtures thereof. In some embodiments, a mean particle size of the micronized DWSP particles ranges from about 1 to about 300 microns. In some embodiments, an amount of the DWSP ranges from about 40 wt % to about 95 wt % of the micronized DWSP particles. In some embodiments, an amount of the additive ranges from about 5 wt % to about 60 wt % of the micronized DWSP particles.

In some embodiments, prior to the introduction of the micronized dry water soluble polymer (DWSP) particles into the waste material, the method includes at least one of dissolving or dispersing the micronized DWSP particles in a first liquid.

In some embodiments, the first liquid is one or more selected from the group consisting of water, an alcohol, a glycol and an oil.

In some embodiments, the component is at least one selected from the group consisting of water, a mineral solution, and mixtures thereof.

In some embodiments, the mean particle size of the micronized DWSP particles ranges from about 50 microns to about 200 microns.

In some embodiments, micronized dry water soluble polymer (DWSP) particles include a DWSP polymer and an additive. In some embodiments, the DWSP is selected from the group consisting of a dry anionic, a dry cationic, a dry nonionic water soluble polymer, and mixtures thereof. In some embodiments, the additive is one or more selected from the group consisting of an inorganic salt, an organic salt, an insoluble water absorbing material, and mixtures thereof. In some embodiments, a mean particle size of the micronized DWSP particles ranges from about 1 micron to about 300 microns. In some embodiments, an amount of the DWSP ranges from about 40 wt % to about 95 wt % of the micronized DWSP particles. In some embodiments, an amount of the additive ranges from about 5 wt % to about 60 wt % of the micronized DWSP particles.

In some embodiments, the mean particles size ranges from about 50 microns to about 200 microns.

In some embodiments, the micronized DWSP particles at least one of dissolve or disperse in a solution of water or brine in about 5 minutes or less.

In some embodiments, the micronized DWSP particles at least one of dissolve or disperse in a solution of water or brine in about 1 minute or less.

DETAILED DESCRIPTION

The present invention will be described in more detail below.

All percentages and ratios used herein are by weight of the total composition and all measurements made are at about room temperature and normal pressure unless otherwise designated. "Room temperature" as defined herein means a temperature ranging between about 22° C. and about 26° C. All temperatures are in degrees Celsius unless specified otherwise.

The present invention can comprise (open ended) or consist essentially of the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise.

As used herein, "consisting essentially of" means that the invention may include ingredients in addition to those recited in the claim, but only if the additional ingredients do not materially alter the basic and novel characteristics of the claimed invention. Preferably, such additional ingredients will not be present at all or only in trace amounts. However, it may be possible to include up to about 10% by weight of materials that could materially alter the basic and novel characteristics of the invention as long as the utility of the compounds (as opposed to the degree of utility) is maintained.

All ranges recited herein may include the endpoints, including those that recite a range "between" two values. Terms such as "about," "generally," "substantially," and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value.

It should be further understood that a description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.3, 3, 4, 5, 5.7 and 6. This applies regardless of the breadth of the range.

As used herein, "particle size" or "mean particle size" has been determined using a Coulter Counter, Micro Track particle analyzer, or by sieving.

Dry water soluble polymer (DWSP) particles, methods of making the same, and applications therewith are disclosed herein. The DWSP particles in accordance with the present invention advantageously can dissolve in fresh water and/or brine solution, and can dissolve over a shorter period of time than conventional DWSPs. In some embodiments, the DWSP particles of the present invention can dissolve within several minutes, preferably in less than one minute, and more preferably within about 30 seconds in fresh water and/or brine solution. The DWSP particles of the present invention having improved handling and feeding, among other advantages, making these materials a competitive, low cost alternative to liquid emulsion polyelectrolytes.

Dry Water Soluble Polymers (DWSPs)

In one embodiment, dry Water Soluble Polymers (DWSPs) may include dry polyelectrolytes and/or natural water soluble polymers.

A dry polyelectrolyte may include a dry water soluble organic polymer. The dry water soluble organic polymer may be formed by polymerizing one or more monomers in water and then removing the water from the polymerized product to form the dry water soluble organic polymer.

The dry polyelectrolyte can be made by any suitable polymerization and drying process known in the art. Exemplary polymerization techniques can include, without limitation, free radical polymerization, or polymerization using an ionic catalyst. In a preferred embodiment, the dry polyelectrolytes may be made by co-polymerization of one or more monomers in a water solution to form a gel and then removing the water from the gel. In some embodiments, such as in anionic dry polyelectrolytes, a base polymer solution may be hydrolyzed to form an anionic polymer prior to removing water. For example, techniques and apparatus for removing water from the polymerized product may include heating to dehydrate the polymer using double drum driers, continuous belt driers, flash suspension driers, among others. After polymerization and drying, the DWSPs may be a flake-like, or string-like material.

The DWSPs may have a molecular weight greater than about 100,000 g/mol. As used herein, the term 'molecular weight' when referring to polymer is weight average molecular weight, unless otherwise specified. In some embodiments the molecular weight may range from about 100,000 g/mol to about 1,000,000 g/mol. In some embodiments, the DWSPs have a molecular weight in excess of about 1,000,000 g/mol.

The dry polyelectrolyte may be cationic, anionic and/or nonionic. The cationic, anionic and/or nonionic nature of the dry polyelectrolyte may be achieved by the selection of cationic, anionic and/or nonionic monomers for a polymerization process, or by hydrolyzing a nonionic polyelectrolyte with caustic to make an anionic polymer or by reacting a nonionic polymer like polyacrylamide to form a cationic polymer, e.g., the mannich reaction using formaldehyde and dimethylamine.

A cationic monomer may be a monomer that carries a positive charge. Exemplary cationic monomers include dialkylaminoalkyl acrylates, methacrylates, and quaternary or acid salts thereof, including, but not limited to, dimethylaminoethyl acrylate methyl chloride quaternary salt, dimethylaminoethyl acrylate methyl sulfate quaternary salt, dimenthyaminoethyl acrylate benzyl chloride quaternary salt, dimethylaminoethyl acrylate sulfuric acid salt, dimethylamino acrylate hydrochloric acid salt, diethylaminoethyl acrylate, methyl chloride quaternary salt, dimethylaminoethyl methacrylate methyl chloride quartenary salt, dimethylaminoethyl methacrylate methyl sulfate quaternary salt, dimethylaminoethyl methacrylate benzyl chloride quartenary salt, dimethylaminoethyl methacrylate sulfuric acid salt, dimethylaminoethyl methacrylate hydrochloric acid salt, dimethylaminoethyl methacryloyl hydrochloric acid salt; dialkylaminoalkylacrylamides, methacrylamides, and quaternary or acid salts thereof, such as acrylamidopropyltrimethylammonium chloride, dimethylaminopropyl acrylamide methyl sulfate quaternary salt, dimethylaminopropyl acrylamide sulfuric acid salt, dimethylaminoproplyl acrylamide hydrochloric acid salt, methacrylamidopropyltrimethylammonium chloride, dimethylaminopropyl methacrylamides methyl sulfate quaternary salt, dimethylaminopropyl methacrylamides sulfuric acid salt, dimethylaminopropyl methacrylamides hydrochloric acid salt, diethylaminoethylacrylate, diethylaminoethylmethacrylate and diallyldialkylammonium halides, such as diallyldimethyl ammonium chloride.

An anionic monomer may be a monomer which carries a negative charge. Representative anionic monomers include (meth)acrylic acid, and salts thereof, including, but not limited to, acrylic acid, sodium acrylate, ammonium acrylate, methacrylic acid, sodium methacrylate, and ammonium methacrylate: 2-acrylamido-2-methylpropanesulfonic acid (AMPS) and its sodium salt; vinyl sulfonic acid and salts thereof, including sodium vinyl sulfonate; styrene sulfonic acid and salts thereof; maleic acid and salts thereof, including, but not limited to a sodium salt and an ammonium salt; sulfopropyl acrylate or methacrylate or other water-soluble forms of these or other polymerisable carboxylic or sulphonic acids; sulfomethylated acrylamide; allyl sulfonate;

itaconic acid, acrylamidomethylbutanoic acid; fumaric acid; vinylphosphonic acid; allylphosphonic acid, phosphonomethylated acrylamide, and the like.

A nonionic monomer may be a monomer that is electrically neutral, such as carrying neither a positive or negative charge. Representative nonionic monomers include acrylamide, methacrylamide, N-methylacrylamide, N,N-dimethylacrylamide, N,N-diethylacryalmide, N-isopropylacrylamide, N-vinylformamide, N-vintlmethylacetamide, dimethylhydroxypropyl (meth)acrylate, hydroxyethyl methacrylate, hydroxyethyl acrylate, hydroxypropyl acrylate, hydroxypropyl methacrylate, N-t-butylacrylamide, N-methylolacrylamide, vinyl acetate, acrynonytrile, 2-ethylhexyl acrylate, ethylene oxide, propylene oxide and the like.

DWSPs may include copolymers or terpolymers. For example, copolymers or terpolymers may be used to tailor desirable properties, such as improved brine stability, better coagulating and flocculating performance, and high solution viscosities, among other properties. One exemplary cationic dry polyelectrolyte is a copolymer of acrylamide and dimethyl amino ethyl acrylate methyl chloride quat having a molecular weight in excess of about 5,000,000 g/mol. In some embodiments, the copolymer may be formed by polymerization of about 70 mole % acrylamide blended with about 30 mole % dimethyl amino ethyl acrylate methyl chloride quat and then polymerized using a free radical catalyst producing a polymer having a molecular weight in excess of about 5,000,000 g/mol. An exemplary anionic dry polyelectrolyte is a copolymer of acrylamide and the sodium salt of acrylic acid using a free radical catalyst, the copolymer having a molecular weight in excess of about 5,000,000 g/mol. In some embodiments, the copolymer may be polymerized from about 80 mole % acrylamide monomer and about 20 mole % sodium salt of acrylic acid monomer. Exemplary nonionic polyelectrolytes include polyacrylamide polymerized from an acrylamide monomer, and having a molecular weight of about 5,000,000 g/mol, and polyethylene oxide polymerized from an ethylene oxide monomer, and having a molecular weight in excess of about 1,000,000 g/mol.

Natural water soluble polymers may include polysaccharides, starches, guar gum, chitosan, carboxymethyl cellulose (CMC), carboxymethyl hydroxyethyl cellulose (CMHEC), and the like.

Micronized DWSP Particles

DWSP particles having a mean particle size ranging from about 1 to about 300 microns and include an additive will be referred to herein as 'micronized DWSP particles'. In some embodiments, the micronized DWSP particles have a mean particle size ranging from about 50 to about 200 microns. DWSP particles having a larger particle sized than about 300 microns will be referred to herein as 'DWSP particles'.

Micronized DWSP particles include a DWSP and an additive. The additive may include one or more of an organic salt, an inorganic salt, an inorganic oxide, an inorganic hydroxide, and/or an insoluble water absorbing material. In some embodiments, the additive may include both a salt and an insoluble water absorbing material.

The inorganic oxide, hydroxide, salt or organic salt may include, without limitation, oxides, hydroxides, sulfates, phosphates, bicarbonates, carbonates, chlorides, fluorides, borates, citrates, and tartrates. In some embodiments, the inorganic oxides or salts may include, but are not limited to, hydrogen, ammonium, sodium, potassium, lithium, calcium, magnesium, barium, strontium, aluminum, iron, and zirconium form. In some embodiments, the inorganic salts or salts may include a counter ion, but are not limited to, hydrogen, ammonium, sodium, potassium, lithium, calcium, magnesium, barium, strontium, aluminum, iron, and zirconium. In some embodiments the oxides may include calcium oxide, magnesium oxide, dolomite (CaO×MgO), aluminum oxide. In some embodiments, salts for a dry cationic polyelectrolyte may include calcium chloride and/or magnesium chloride. In some embodiments, salts for an anionic dry polyelectrolytes may include potassium citrate, sodium citrate, potassium carbonate, potassium bicarbonate, sodium carbonate, and/or sodium bicarbonate. In some embodiments, oxides for an anionic dry polyelectrolyte may include calcium oxide, magnesium oxide, dolomite (CaO×MgO), aluminum oxide.

Insoluble water absorbing materials may include materials that may absorb water and still remains dry to the touch. Insoluble water absorbing materials may include one or more of activated silica, silica gel, activated alumina, silica, alumina, clays, zeolites, activated carbon, and the like.

The DWSPs and the additive may be mixed in any suitable weigh ratios necessary to achieve a desired particle size range, level of solubility, hydroscopic level, or the like. The amount of DWSP may range from about 40 wt % to about wt %. In some embodiments, the amount of DWSP particles ranges from about 50% to about 85%. The amount of additive may range from about 5 wt % to about 60 wt %. In some embodiments, the amount of additive ranges from about 15 wt % to about 50 wt %. In one embodiment, the additive includes silica gel at about 5 wt %, relative to the total weight of DWSP and additive.

The micronized DWSP particles may have a mean particle diameter ranging from about 1 micron to about 300 microns. In some embodiments, the mean particle diameter may range from about 50 to about 200 microns. In some embodiments, the micronized DWSP particles have a mean particle size ranging from about 135 to about 200 microns. In some embodiments, the micronized DWSP particles have a mean particle size ranging from about 150 to about 200 microns. In some embodiments, the mean particle diameter may be about 150 microns or less. In some embodiments, the mean particle diameter may range from about 20 microns to about 80 microns. In some embodiments, the mean particle diameter may range from about 30 microns to about 60 microns. In some embodiments the mean particle diameter may range from about 40 microns to about 60 microns.

The micronized DWSP particles may be dispersed and/or dissolved in a first liquid. The first liquid may include one or more of water, brine, liquid $CO_2$, an alcohol, a glycol and an oil, among other liquids. In some embodiments, brine has a concentration ranging from about 2000 mg/l to at least about 350,000 mg/ml. In some embodiments, the micronized DWSP particles may be dispersed or dissolved in water or brine in about 5 minutes or less. In some embodiments, the micronized DWSP particles may be dispersed or dissolved in water or brine in about 1 minute or less.

Method of Making Micronized DWSP Particles

DWSPs, which may have a flake-like or string-like consistency after polymerization and drying, may be initially formed into DWSP particles. In some embodiments, the DWSP particles may have mean particle size ranging from greater than about 300 microns to 500 microns. The DWSP particles may dissolve or disperse when added to water. However, the time period necessary to dissolve or disperse DWSP particles is undesirable for application. In some embodiments, the time period to disperse and/or dissolve DWSP particles may be about 30 minutes to 60 minutes, or greater. Moreover, forming DWSP particles having a finer mean particle diameter than about 350 to 500 microns is difficult using conventional processes and the resulting DWSP particles may be hydroscopic and will aggregate, making them difficult to disperse and/or dissolve.

The DWSP particles may be further reduced in size to form micronized DWSP particles. Micronized DWSP particles may disperse or dissolve faster than DWSP particles, and may be less hydroscopic as well. The micronized DWSP particles may be formed by mixing the additive with the DWSP particles at least one of prior to, during, or after reduction of the DWSP particles. In some embodiments, the additive may function as a milling element, for example, to reduce the size of the DWSPs during a milling process. For example, the additive may act as a knife or a hard object, such as a ball of a balling milling device, to reduce the particle size of the DWSP particle in an efficient manner. In some embodiments, the additive may function to prevent agglomeration in the micronized DWSP particles.

The additive may be mixed with DWSPs at one or more stages of the process of forming the micronized DWSP particles. In some embodiments, the DWSPs may be mixed with the additive, and then DWSP particles may be formed, where the DWSP particles having a mean particle size greater than about 300 microns and including the additive.

In some embodiments, the DWSP particles may be formed, and then the additive may be mixed with the DWSP particles prior to or during reduction in the size of the DWSP particles to form the micronized DWSP particles. The additive may aid in the reduction of the DWSP particles when added prior to or during reduction of the DWSP particles. The additive may also limit or prevent agglomeration, due to the hydroscopic nature of DWSPs, as particle size of the DWSPs is being reduced.

In some embodiments, the DWSP particles may be reduced in particles size, and then the DWSP particles may be mixed with the additive to form micronized DWSP particles. In some embodiments, some DWSPs may be difficult to micronize without the additive because some DWSPs are soft and deform when impacted in a milling system.

In some embodiments, the additive may be introduced at more than one stage during the process of making the micronized DWSP particles. For example, a DWSP and additive could be mixed, and DWSP particles may be formed. Then, the DWSP particles could be further mixed with additive and then reduced in size to form micronized DWSP particles.

Mixing of a DWSPs and an additive may be performed in a separate device, such as a mixer, or in the device used to forming the DWSPs into particles, such as a milling device. In some embodiments, a DWSP and an additive may be mixed in a mixer or like device, and then the mixture of DWSP and additive may be introduced into a milling device to form DWSP particles including the additive. In some embodiments, DWSP particles and an additive may be mixed in a mixer or like device, and then the mixture of DWSP particles and the additive may be introduced into a milling device to form micronized DWSP particles.

The micronization process by which the DWSPs particles are reduced in particle size may use autogenous and/or impact milling or grinding. Exemplary devices that may be utilized include jet mills, hammer mills, cryogenic mills, roller mills and air classifying mills (ACMs). In some embodiments, an ACM or an air swept hammer mill are used.

ACMs are used for size reduction of various products to produce fine particle sizes. One exemplary ACM is an Ultrafine Air Classifying Mill, available from Hosokawa Micron Ltd. An ACM may incorporate an integral classifier or screen deck where fine particles of a desired size are segregated and oversize particles go back to a grinding chamber and re-grinded until the desired particle size is obtained. Advantageous features of an ACM include grinding and classification in a single compact space saving design, cool and smooth grinding, steep particle size distribution, a sharp classifier cut point that is adjustable, and low specific energy requirement, among others. In one exemplary operation DWSP particles to be micronized may be conveyed from a hopper by screw feeder or pneumatically fed through a rotary air lock feeder to a grinding chamber of the ACM. A rotor may be present in the grinding chamber. The rotor may include pins and/or bars to micronize the particles. The micronized particles are entrained by an air stream, which may enter below the rotor, and are carried up between an inner wall and a shroud ring having baffles to decrease air swirl. The micronized particles then enter the classifying section where micronized particles having a desired particle size are carried out through the classifier rotor to the outlet, and micronized particle having a particle size greater than the desired size is returned to the grinding chamber for further micronization. After leaving the outlet of the ACM, air mixed with the particles having the desired particle size enter a bag filter where the particles are separated from the air stream and the air is discharged to the atmosphere or recirculated into the ACM.

A hammer mill is a machine that shreds or crushes aggregate material into smaller pieces. Hammer mills are used in many applications, including grinding ores, plastics, polymers, glass and the like. In one exemplary embodiment, a hammer mill may include a steel drum containing a rotating shaft or drum on which hammers are mounted. The hammers may be free to swing or fixed to the rotating shaft. The rotating shaft may be spun at a high speed inside the drum while material is fed into the drum to be impacted by the hammers and shredded or crushed. The crushed material is expelled through screens in the drum of a selected size, such that particles of a desired size may pass through the screens. Alternatively, a screenless hammer mill may use air flow to separate small particles from larger ones similar to an ACM. A screenless hammer mill may be more reliable, cheaper and energy efficient compared to a conventional hammer mill.

A hammer mill may be used as a primary, secondary, or tertiary crusher. For example, a hammer mill could be utilized as a coarse milling device, and then an ACM could be used as a fine milling device. Alternatively, a hammer mill may be used alone, or in combination with other milling devices.

Jet mills do not use a grinding media, such as the rotor in an ACM or a hammer in a hammer mill. On exemplary jet mill is a Micron-Master® jet pulverizer, available from The Jet Pulverizer Company, Inc. of Moorestown, N.J. For example, pulverization of DWSP particles may take place in a chamber, such as a torrodial shaped chamber, when the particles are driven at sufficient velocity around the perimeter of the chamber by jets of air or steam. Size reduction of the particles may result from collisions between particles. The interior of the chamber may be designed to allow recirculation of particles greater than the desired particle size, enhancing the incidence and the effect of collisions. As particles are reduced in size and mass, the particles migrate toward a discharge port, making classification both automatic and controllable. The particles are separated from the air stream using a cyclone or bag filter and the air leaving the cyclone or bag filter is discharged to the atmosphere or recycled back into the process.

A jet mill involves no moving parts or screens which may limit contamination and excess heat from being produced. A jet mill may be suitable for friable or crystalline materials, abrasive materials, materials require high purity, and/or heat sensitive materials. A jet mill may accommodate cryogenic applications. Precise metering of particle input and air or steam velocity may produce predictable and repeatable graduation and classification of the finished particles is possible.

Applications

The micronized DWSP particles may be used in applications, such as turbidity removal in municipal drinking water and industrial process water, sludge dewatering in municipal and industrial water and waste water treatment applications, retention aids in the paper industry, tailings separation in the mining industry, friction reduction in well stimulation applications for the oil and gas industry, building viscosity in fluid used in drilling, fracturing and coil tubing operations in the oil and gas industry, use of polymers in enhanced oil flooding operations, and use as a proppant carrier in well stimulation applications, among other applications.

When used in various applications, for example, such as those applications disclosed herein, the micronized DWSP particles may be added to the application directly in a dry state, or by dispersing or dissolving the micronized DWSP particles in a liquid media and then pumping a dispersion and/or solution of the micronized DWSP particles into the application. In some embodiments, the equipment for the application may necessitate the way the micronized DWSP particles are added. For example, some equipment locations fail to provide a means of directly adding micronized DWSP particles to a process stream being treated. One exemplary embodiment is a settling basin located in a remote area unprotected from the elements—wind, rain, snow, etc. Micronized DWSP particles are dispersed and/or dissolved in a liquid in a pumping building remote from the settling basin, and then pumped from the remote building into a process stream, where the process stream then enters the settling basin.

When a dispersion of the micronized DWSP particles is used, fresh water and brine solution may be preferred liquid because these liquids do not add to the cost of application. However, other liquids may be used, including isopropyl alcohol, propylene glycol, mineral oil, and vegetable oil, among others. One exemplary application where a mineral oil is preferred over water is in 100% liquid $CO_2$ fracturing of oil/gas wells and $CO_2$ flooding in enhanced oil recovery process using liquid $CO_2$ in the oil and gas industry. In this application water may be detrimental to the $CO_2$ process and needs to be avoided.

A Method of Dewatering Sludge

In various municipal and industrial waste water treatment applications a sludge is dewatered prior to ultimate disposal. For example, a municipal waste water treatment plant may dewater about 20 tons of dry sludge each day on a belt filter press using an emulsion cationic acrylamide to coagulate and flocculate solids in the sludge allowing water to be removed from the solids. An emulsion cationic acrylamide is fed at a rate of about 24 pounds per ton of solids. The active polymer concentration in the emulsion is about 33%. The sludge concentration is about 4% solids and the flow rate to the filter press is about 82 gallons per minute. The emulsion polymer feed rate to the filter press is about 0.33 pounds per minute or about 0.038 gallons per minute. The emulsion polymer is fed into a water dispersion system, through multi-stage static mixers. The emulsion polymer is diluted to about 0.4 wt % in this system. The flow rate of this diluted emulsion polymer system is about 10 gallons per minute. The final filter cake, e.g., a wet solid, contains about 50 wt % solids, as compared to about 4 wt % solids in the sludge prior to dewatering.

As a replacement for, or in addition to the emulsion cationic acrylamide, micronized DWSP particles may be used to coagulate and flocculate solids from the sludge allowing release of water from the solids. This water may then removed in a dewatering process. Exemplary apparatus that may be used for dewatering processes include settling basins, vacuum filters, filter presses, cloth filters, and/or centrifuges.

In some embodiments, a method of dewatering sludge may include introducing micronized DWSP particles into a sludge. The sludge may include solids and water. The micronized DWSP particles may be added directly to the sludge, or the micronized DWSP particles may be dispersed or dissolved in the first liquid prior to introduction into the sludge.

Water of the sludge may be separated from solids of the sludge using the micronized DWSP particles as a coagulant or a flocculant. The micronized DWSP particles may ensnare, trap or otherwise separate solids from the sludge thereby releasing water from the sludge.

A wet solid including some solids and water from the sludge may be collected, for example, by settling, on a filter, or the like. A concentration of solids in the wet solid is higher than a concentration of solids in the sludge prior to dewatering the sludge.

Method of Fracturing a Subterranean Formation

Friction reducers may be used when fracturing a subterranean formation, such as shale, beneath the ground to release oil, gas, or other hydrocarbons trapped in the formation. This fracturing process is referred to as "Fracking". Mixtures, which may include water, carbon dioxide, sand, and/or chemicals, such as the friction reducer, are pumped into a hole that has been drilled in the subterranean formation to liberate the hydrocarbons trapped within the shale. A friction reducer allows the down hole pressures to range from about 4,000 psi to about 6,000 psi using a head pressure ranging from about 8,000 to about 9,000 psi. Down hole pressures in this range are need to fracture the subterranean formation and release the trapped hydrocarbons. In the absence of a friction reducer, the head pressure would have to exceed about 15,000 psi to achieve the same down hole pressure.

Micronized DWSP particles may be used as friction reducers. In some embodiments, a method of fracturing a subterranean formulation may include introducing micronized DWSP particles into a fracturing liquid to form a mixture. In some embodiments, the fracturing liquid may include one or more of water, brine, or liquid $CO_2$. The micronized DWSP particles may be introduced directly into the fracturing liquid, or the micronized DWSP particles may be dispersed or dissolved in the first liquid prior to introduction into the fracturing liquid.

The mixture of fracturing liquid and micronized DWSP particles may be pumped into the subterranean formation to fracture the subterranean formation. In some embodiments, a proppant may be introduced into the mixture. The proppant may be utilized to maintain an opening in the fractured formation such that hydrocarbons trapped within the formation may be liberated.

Method of Recovering a Component from a Waste Material

Micronized DWSP particles may be utilized in recover of a component from a waste material. The waste material may be from mining or oil processes, such as an ore or oil sands. The component to be recovered may be, for example, a mineral from an ore, or oil from oil sands. Many processes, such as oil and mining processes, may require large volumes of water, for example, to separate a mineral from an ore or oil from oil sands. The processes may result in waste materials, commonly called 'tailings', which may include water, where it may be desired to recover water from the waste materials. In some embodiments, for these processes to be economical, water must be recovered.

A method of recovering a component from a waste material may include introducing micronized DWSP particles into a waste material. The micronized DWSP particles may be introduced directly into the waste material, or the micronized DWSP particles may be dispersed or dissolved in the first liquid prior to introduction into the waste material. The waste material may include one or more of insoluble solids, water to be recovered, and minerals to be recovered, among other components. The component may be separated from the waste material using the micronized DWSP particles. For example, the micronized DWSP particles may be utilized to coagulate and flocculate insoluble solids from the component to be recovered. The component may then be recovered.

Exemplary processes which may benefit from the recover method of the present invention include water recovery. For example, water recovery may be achieved by a solid-liquid separation process, for example, in a settling basin. Solids from the waste material may settle and may be drawn off the bottom of the settling basin. The clarified water, e.g., water of the waste material remaining after settled solids are removed, flows off the top of the settling basin and is recycled. Micronized DWSP particles may be used to separate solids remaining in the clarified water to produce a recycled water which is low in dispersed solids.

Exemplary processes which may benefit from the recovery method of the present invention may include mineral processes where a portion of the ore may be dissolved in a chemical solution and the undissolved material, which may be commonly referred to as 'tailings', may be removed from the chemical solution in a settling basin. The micronized DWSP particles may be utilized to separate the chemical solution from the tailings. Then, the chemical solution, carrying the dissolved mineral, are removed, and the minerals are recovered using another process. The chemical solution may be returned to dissolve more of the desired mineral. Two exemplary minerals to be recovered and chemical solutions include copper oxide from an ore using a sulfuric acid solution, and gibbsite ($Al_2O_3$ X $3H_2O$) from bauxite ore using a caustic solution.

Exemplary processes which may benefit from the recovery method of the present invention may include recovery of gibbsite from red mud. During the production of Alumina, using the Bayer Process, gibbsite (e.g., a desired mineral) is dissolved from a bauxite (e.g., an ore) using a sodium hydroxide solution to produce sodium aluminate. In addition to gibbsite, bauxite contains iron oxide and kaolin clay. The iron oxide and kaolin are insoluble and are often referred to as red mud. Waste material from the gibbsite recovery process, including sodium aluminate dissolved in water and red mud may be sent to large clarifiers (e.g., a settling basin). Micronized DWSP particles may be added to clarify sodium aluminate and water from the red mud suspension. The sodium aluminate may be converted to gibbsite by another process once recovered from the red mud.

EXPERIMENTAL EXAMPLE 1

Experimental Example 1 determines a time required to produce 20 pounds of micronized dry cationic polyelectrolyte particles having a mean particles size of about 60 microns in a jet mill using an additive (Example 1) and without using an additive (Comparative Example 1).

EXAMPLE 1

About 85 wt % dry cationic polyelectrolyte was blended in a ribbon blender with about 15% calcium chloride to produce dry cationic polyelectrolyte particles having a mean particle size of about 350 microns. The dry cationic polyelectrolyte was polymerized from about 20 mole % dimethyl amino ethyl acrylate methyl chloride quat monomer and about 80 mole % acrylamide monomer. The dry cationic polyelectrolyte had a molecular weight of about 5,000,000 g/mol. Calcium chloride was purchased from Vitro of Monterrey, Mexico. The dry cationic polyelectrolyte particles were then micronized in a jet mill (8 inch diameter, The Jet Pulverizer Company, Inc. of Moorestown, N.J.) to a mean particle size of about 60 microns. About 20 pounds of the micronized particles were produced in about 25 minutes. The micronized particles remained dry to the touch for more than about 10 minutes when exposed to air. The micronized particles were free flowing and less hydroscopic than micronized particles made without calcium chloride as described below in Comparative Example 1.

COMPARATIVE EXAMPLE 1

The micronized particles of Comparative Example 1 are made in the same manner as described for Example 1, except calcium chloride is omitted. Therefore, the dry cationic polyelectrolyte particles of Comparative Example 1 are about 100 wt % dry cationic polyelectrolyte, and no blending step is performed. About 20 pounds of micronized particles having a mean particle size of about 60 microns were produced in about 50 minutes using the same jet mill as described in Example 1. The micronized particles immediately started to absorb water and become tacky when exposed to air.

Shelf Life Studies

Shelf life studies were run with the particles of Example 1 and Comparative Example 1. The particles were sealed in a plastic bag with about 25% of the bag volume being air at atmospheric pressure. These bags were then stored a closed container where temperatures varied from about 20° F. to about 100° F. The container was open monthly to determine the stability of the particles. The particles of Comparative Example 1 began to agglomerate after about two months. Agglomeration was determined by turning the bag over several times to see if the particles flow freely. Using the same measure of agglomeration, the particles of Example 1 remained free flowing for longer than about 12 months of storage.

EXPERIMENTAL EXAMPLE 2

Experimental Example 2 simulates the conditions of a municipal treatment plant described herein at a laboratory scale using a filter press with micronized cationic polyelectrolyte particles (Example 2) and an emulsion cationic polymer (Comparative Example 2).

A container (about 5 gallons) filled with about 4 gallons of about 4 wt % solids sludge. The polymer to be tested was mixed with the sludge, using a paddle, for about 30 seconds. A filter press was connected to a vacuum pump and a filter (cloth, about 5 inch diameter) was fitted on the filter press surface. The filter press was gently dipped into the sludge in the container until it was about 10 inches from the bottom of the container with a face of the filter press parallel to the bottom of the container. The vacuum pump was then activated to draw water through a hose connected to the filter press and depositing solids on the filter cloth. The sludge was gently mixed and the vacuum was stopped after about 2 gallons of filtrate was collected. The time to collect the filter cake and the moisture level of the filter cake were recorded.

EXAMPLE 2

About 85 wt % dry cationic polyacrylamide was blended in a ribbon blender with about 15 wt % dry calcium chloride. The dry cationic polyacrylamide was polymerized from about 30 mole % dimethyl amino ethyl acrylate methyl chloride quat and about 70 mole % acrylamide monomer. The dry cationic polyacrylamide had a molecular weight of about 4,000,000 g/mol. The dry cationic polyacrylamide particles, including dry calcium chloride, were then micronized in an ACM mill (Hosokawa, Ltd., 10 inch) to a mean particle size of about 60 microns.

The dry micronized cationic polyacrylamide particles were dispersed in water in a wearing blender for about 15 seconds to make about 0.1% aqueous solution. The aqueous solution was added to the container and the sludge was dewatered as described above. The aqueous solution was fed at rates of about 5.0, about 6.0, about 7.0 and about 8.0 pounds per ton. At dosages of about 7.0 pounds per ton, about greater than 50 wt % solids cake was formed having a total weight of about 1.3 pounds in less than about 1 minute.

COMPARATIVE EXAMPLE 2

A cationic acrylamide emulsion polyelectrolyte contained about 33 wt % cationic polyacrylamide, about 33 wt % mineral oil, and about 8 wt % surfactant (alcohol ethoxylates) with the balance being water was added to the container and the sludge was dewatered as described herein. The cationic acrylamide emulsion polyelectrolyte has about the same mole % cationic charge and molecular weight as the micronized particles in Example 2. Prior to adding the emulsion polyelectrolyte to the apparatus, the emulsion polyelectrolyte was blended with water in a wearing blender for 15 seconds. The aqueous solution of emulsion polyelectrolyte was fed at rates of about 15, about 20, about 25 and about 30 pounds per ton. At dosages between 25 and 30 pounds per ton, about greater than 50 wt % solid cake having a weight of about 1.3 pounds was formed in less than about 1 minute.

Results

Extrapolating the results of Experimental Example 2, about 6.0 pounds (lbs) of the micronized particles (5.1 lbs of DWSP) may produce equivalent results as about 25 lbs (8.25 lbs of active polymer) of the cationic acrylamide emulsion polyelectrolyte. In both examples approximately 1.3 pounds of wet cake (50 wt % dry solids) were recovered which is similar to the cake solids achieved in the plant on the filter press.

From a cost perspective, the cationic emulsion polymer cost about $1.08 per lb delivered to the waste water treatment plant. This is a cost of about $27 per dry ton of solids recovered from sludge. The micronized polymer particles blend may be sold at about $3.93 per lb delivered. At about 6 lbs of Micronized DWSP particles per ton of solids recovered the cost of about $23.50 per dry ton of solid recovered.

EXPERIMENTAL EXAMPLE 3

Experimental Example 3 simulate conditions of a fracturing process described herein on a laboratory scale using a friction loop apparatus with micronized cationic polyelectrolyte particles pre-dissolved in a brine solution prior to entry into the apparatus (Example 3A), with micronized cationic polyelectrolyte particles directly added to the apparatus (Examples 3B and 3C), with an emulsion cationic polymer (Comparative Example 3A), and with unmicronized cationic polyelectrolyte particles (Comparative Example 3B).

The friction loop apparatus includes a reservoir (about 50 gallons) fluidly coupled to an inlet of a progressive cavity pump (Monyo, Inc., of Springfield, Ohio, about 10 gallon per minute capacity) The outlet of the pump is fluidly coupled to an inlet of a tube (about 45 feet long, about ⅝ inch internal diameter), where the solution is pumped through the tube to an outlet of the tube. The outlet of the tube is fluidly coupled to container (about 55 gallon) for receiving fluids exiting the tube. In operation, the reservoir is filled with a fluid which includes the polymer being studied. The fluid is pumped from the reservoir by the pump and through the tube to the container. Pressure readings were taken at the outlet of the pump to determine a head pressure, and about 10 feet before the outlet of the tube to determine an exit pressure. Friction reduction (%) is the difference in pressure between the two measured pressures relative to the difference in measured pressures when no polymers are added to the fluid.

EXAMPLE 3A

About 85 wt % dry cationic polyelectrolyte was blended in a ribbon blender with about 15% calcium chloride to produce dry polyacrylamide polyelectrolyte particles having a mean particle size of about 350 microns. The dry cationic polyelectrolyte was polymerized from about 30 mole % cationic monomer (dimethyl amino ethyl acrylate methyl chloride quat) and about 70 mole % acrylamide monomer. The dry cationic polyelectrolyte had a molecular weight of about 4,000,000 g/mol. The blended particles of dry cationic polyelectrolyte and calcium chloride were then micronized in an ACM mill (Hosokawa, Ltd., 10 inch) to a mean particle size of about 60 microns forming the micronized cationic polyelectrolyte particles.

The micronized dry cationic polyelectrolyte particles were dispersed in a brine solution containing about 30,000 mg/l of a calcium chloride, barium chloride and strontium chloride at a concentration of about 0.5 to about 1 wt %, relative to the total weight of the dispersion, for about 15 seconds. The dispersion (about 10 grams to about 20 grams of micronized dry cationic polyelectrolyte dispersed in about 2,000 ml of brine water) was added to the reservoir, where the reservoir was filled with about 30 gallons of brine (30,000 mg/l of a calcium chloride, barium chloride and strontium chloride). Friction reduction exceeded about 65% in less than about 20 seconds of pumping at a rate of 10 gallons per minute.

EXAMPLE 3B

The micronized cationic polyelectrolyte particles of Example 3B are made in the same manner as described for Example 3A, except they were not premixed with the brine solution in the blender. Here, the micronized cationic polyelectrolyte particles were added directly to the 30 gallons of 30,000 mg/l brine in the reservoir at about 80 mg of particles per 1 Liter of brine in the reservoir, or about 10 grams of micronized cationic polyelectrolyte particles in about 30 gallons of brine. Friction reduction exceeded about 65% in less than about 30 seconds of pumping at 10 gallons per minute.

EXAMPLE 3C

The micronized particles of Example 3C are made in the same manner as described for Example 3A, except the blending includes about 85% dry cationic polyelectrolyte, about 10% calcium chloride and about 5% silica. These three components were first blended in a blender prior to micronizing. They were micronized in an ACM mill to about 60 microns mean particle size.

The friction reduction obtained was similar to Examples 3A and 3B, greater than about 65% friction reduction in less than about 30 seconds.

COMPARATIVE EXAMPLE 3A

A cationic acrylamide emulsion polyelectrolyte contained about 33 wt % cationic acrylamide polyelectrolyte, about 30 wt % water, about 30 wt % mineral oil, and about 7 wt % surfactant (alcohol ethoxylates) was dispersed in fresh water, ranging from about 100 grams to about 200 grams of the emulsion dry cationic polyelectrolyte dispersed in 2,000 ml of water, for about 15 seconds. The cationic acrylamide emulsion polyelectrolyte has about the same mole % cationic charge and molecular weight as the micronized particles in Example 3A. The cationic acrylamide polyelectrolyte was a copolymer of dimethyl amino ethyl acrylate methyl chloride quat and acrylamide. The dispersion was added to the reservoir, where the reservoir was filled with about 30 gallons of brine (30,000 mg/l of a calcium chloride, barium chloride and strontium chloride) at an emulsion polyelectrolyte concentration of about 1,000 mg/l to give plus 65% friction reduction. On a active polymer basis this is about 330 mg/l compared to the 80 mg/l of the micronized cationic polyelectrolyte particles.

COMPARATIVE EXAMPLE 3B

The particles of Comparative Example 3C are made in the same manner as described in Example 3A, except the particles are not micronized using an ACM. The unmicronized particles are dissolved in fresh water for about 60 minutes at a concentration of about 0.3%. The polymer completely dissolved in about 60 minutes. The solution was added to the reservoir at a concentration of about 100 mg of active polymer per liter of brine and gave friction reduction exceeded about 65% in about 20 seconds of pumping.

Results

The normal dosage for a cationic emulsion polymer as a friction reducer is about 0.5 gallons per thousand gallon (gpt)(about 500 mg/1) of injection water to generate about 70% plus friction reduction in fresh water. If the injection water is a brine solution then the dosage ranges from about 1.0 to about 2.0 gpt (about 1,000 to about 2,000 mg/l) to generate about 70% plus friction reduction.

The test results confirm (Comparative Example 3A) the need to feed about 1 gpt or about 1,000 mg/l of the emulsion cationic friction reducer to achieve greater than 65% friction reduction in the friction loop apparatus.

On an active polymer basis, the micronized dry cationic polyelectrolyte particles dispersed in a brine solution or simply added to the reservoir fluid significantly outperformed the emulsion. The micronized particles also outperformed the unmicronized dry cationic polyelectrolyte particles dissolved in fresh water, which required significantly longer mixing times for dispersion prior to introduction into the reservoir fluid.

EXPERIMENTAL EXAMPLE 4

Experimental Example 4 compares the preparation of micronizied DWSP particles using different milling processes, an ACM (Example 3A) and a Jet Mill (Example 4).

EXAMPLE 4

Dry micronized cationic polyelectrolyte particles were prepared as described in Example 3A, except a jet mill (8 inch diameter, The Jet Pulverizer Company, Inc. of Moorestown, N.J.) was used for micronization.

It took about twice as long to micronize the blended particles to a mean particle size diameter of about 60 microns in the jet mill. The moisture level was about 2% to about 3% higher than the micronized particles of Example 3A. Moisture levels were determined on a moisture balance. (Sartotius MA150 Moisture Analyzer).

EXPERIMENTAL EXAMPLE 5

Experimental Example 5 uses the same apparatus as Experimental Example 3, except uses micronized anionic polyelectrolyte particles pre-dissolved in a brine solution prior to entry into the apparatus (Example 5), an emulsion anionic polymer (Comparative Example 5A), and with unmicronized anionic polyelectrolyte particles (Comparative Example 5B).

EXAMPLE 5

About 85 wt % dry anionic polyacrylamide polyelectrolyte was blended in a ribbon blender with about 15% sodium citrate to produce dry anionic polyacrylamide polyelectrolyte particles having a mean particle size of about 350 microns. The dry anionic polyacrylamide polyelectrolyte was polymerized from about 30 mole % sodium salt of 2-acrylamido-2-methyl propane sulfonic acid (AMPSA) monomer and about 70 mole % acrylamide monomer. The dry anionic polyelectrolyte had a molecular weight of about 6,000,000 g/mol. The dry anionic polyelectrolyte particles were then micronized in a jet mill (8 inch diameter, The Jet Pulverizer Company, Inc. of Moorestown, N.J.) to a mean particle size of about 100 microns.

The micronized dry anionic polyelectrolyte particles were dispersed in a brine solution containing about 30,000 mg/l of a calcium chloride, barium chloride and strontium chloride at a concentration of about 0.5 to about 1.5 wt %, relative to the total weight of the dispersion of particles and brine, for about 15 seconds. The dispersion (about 15 grams to 30 grams of micronized dry anionic polyelectrolyte dispersed in about 2,000 ml of brine water) was added to the reservoir, where the reservoir was filled with about 30 gallons of brine (30,000 mg/l of a calcium chloride, barium chloride and strontium chloride) such that a concentration of anionic polyelectrolyte in the reservoir fluid was about 150 mg/l. Friction reduction exceeded about 65% in less than about 20 seconds of pumping at the rate of about 10 gallons per minute.

COMPARATIVE EXAMPLE 5A

A anionic acrylamide emulsion polyelectrolyte contained 30% anionic polymer, 31% oil, 30% water and 9% surfactant (alcohol ethoxylates) was added to the friction loop apparatus. The anionic acrylamide emulsion polyelectrolyte has about the same mole % anionic charge, the same monomers (AMPSA and acrylamide) and molecular weight as the micronized particles in Example 5. The emulsion anionic polymer was dispersed in fresh water in a wearing blender for two minutes making a 0.5 wt % solution. This solution was added to the reservoir, where the reservoir was filled with about 30 gallons of brine (30,000 mg/l of a calcium chloride, barium chloride and strontium chloride) such that a concentration of emulsion polyelectrolyte was about 1,300 mg/l. Friction reduce exceeded about 65% at a pumping rate of about 10 gallons per minute in less than about 60 seconds.

COMPARATIVE EXAMPLE 5B

The particles of Comparative Example 5B are made in the same manner as described in Example 5, except the particles are not micronized using the jet mill. The unmicronized particles are dissolved in fresh water for about 60 minutes to produce a clear solution (about 0.2 wt %). The solution was added to the reservoir such that the concentration of polymer in the reservoir was about 175 mg/L. Friction reduction exceeded about 65% in about 20 seconds of pumping.

Results

The normal dosage for an anionic emulsion friction reducer is in the about 0.75 gallons per thousand (gpt) (about 650 mg/l) of injection water to generate about 70% plus friction reduction in fresh water. If the injection water is a brine solution then the dosage ranges from about 1.5 to about 3.0 gpt range (about 1,300 to about 2,600 mg/l) to generate about 70% plus friction reduction.

The test results confirm (Comparative Example 5A) the need to feed about 1.5 gpt or about 1,500 mg/l of the anionic emulsion polyelectrolyte to achieve greater than 65% friction reduction in the friction loop apparatus.

On an active polymer basis, the micronized dry anionic polyelectrolyte particles significantly outperformed the emulsion. The micronized particles also outperformed the unmicronized dry cationic polyelectrolyte particles dispersed in fresh water, which required significantly longer mixing times for dispersion prior to introduction into the reservoir fluid.

EXPERIMENTAL EXAMPLE 6

Experimental Example 6 simulate conditions of a recovery process of sodium aluminate from red mud, as described herein, on a laboratory scale using settling test apparatus with micronized anionic polyelectrolyte particles pre-dissolved in fresh water prior to entry into the apparatus (Examples 6A and 6B), with micronized anionic polyelectrolyte particles directly added to the apparatus (Example 6C), with an emulsion anionic polyelectrolyte (Comparative Example 6A), and with unmicronized anionic polyelectrolyte particles (Comparative Example 6B).

The settling test apparatus includes a container (2,000 ml graduated cylinders). The container was filled to a 2,000 ml graduation with red mud, which was at a temperature of about 175° F. The amount of solids in the red mud was about 2.5 wt %, wherein the remainder of the red mud was a sodium aluminate water solution to be clarified and sent on for further processing to recover the pure gibbsite and recycle the sodium hydroxide solution. The polymer being tested was added to the container. Then, the container was capped and inverted several times (about 6 times) to mix the polymer and the red mud. The red mud formed a flock and then began to settle. The time to settle to the 400 ml graduation of the container at the bottom of the cylinder was recorded. The faster the settling the better the performance.

EXAMPLE 6A

About 75 wt % dry anionic polyacrylic acid polyelectrolyte was blended in a ribbon blender with about 25% sodium carbonate to produce dry anionic polyelectrolyte particles having a mean particle size of about 350 microns. The dry polyacrylic acid polyelectrolyte was polymerized from about 100 mole % acrylic acid monomer. The dry anionic polyacrylic acid had a molecular weight of about 4,000,000 g/mol. The dry anionic polyelectrolyte particles were then micronized in an ACM mill (Hosokawa, Ltd., 10 inch) to a mean particle size of about 100 microns.

The micronized dry polyacrylic acid polyelectrolyte particles were dispersed in fresh water at a concentration of about 0.2 wt % for about 20 seconds. The dispersion was added to the container such that the concentration of dry polyacrylic acid polyelectrolyte in the container was about 150 mg per about 1 liter of red mud. The solids settled to the 400 ml graduation of the container in about 45 seconds.

EXAMPLE 6B

Micronized particles of Example 6B are made in the same manner as described for Example 6A, except the blending includes about 75% dry anionic polyacrylic acid polyelectrolyte and about 25% silica.

The micronized particles are dispersed in fresh water for 20 seconds at a concentration of about 0.2 wt %. The dispersion was added to the container such that the concentration of dry polyacrylic acid polyelectrolyte in the container was about 150 mg per about 1 liter of red mud. The settling characteristics were about the same as that of Example 6A, settling to the 400 ml mark in about 45 seconds.

EXAMPLE 6C

Micronized particles of Example 6C are made in the same manner as described for Example 6A, except the micronized particles were added directly to the red mud without dispersing in fresh water. The micronized particles were added to the container such that the concentration of dry polyacrylic acid polyelectrolyte in the container was about 100 mg per about 1 liter of red mud. The settling characteristics were similar to Examples 6A and Example 6B, settling to the 400 ml graduation in about 45 seconds. However, the dosage required to generate this settling rate was 33% lower than when the micronized acrylic acid polyelectrolyte particles were predispersed in water in Examples 6A-B.

COMPARATIVE EXAMPLE 6A

A anionic emulsion polyelectrolyte contained about 30% anionic polymer, 30% water, 31% oil and 9% surfactants. The anionic polymer was formed by polymerizing about 100% acrylic acid. The molecular weight of the anionic polymer was greater than about 3,000,000 g/mol The anionic emulsion polyelectrolyte was added to the container such that the concentration of the emulsion polyelectrolyte in the container was about 500 mg per about 1 liter of red mud, or about 150 mg of polyacrylic acid per about 1 liter of red mud. The solids settled to the 400 ml graduation of the container in about 45 seconds.

COMPARATIVE EXAMPLE 6B

The particles of Comparative Example 6B are made in the same manner as described in Example 6A, except the particles are not micronized using the ACM. The unmicronized particles are dissolved in fresh water for about 60 minutes to produce a clear solution of about 0.2 wt % particles. The solution was added to the reservoir such that the concentration of particles in the reservoir was about 125 mg/L. The solids settled to the 400 ml graduation of the container in about 45 seconds.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of reducing friction during fracturing a subterranean formation, comprising:
introducing micronized dry water soluble polymer (DWSP) particles having a mean particle size ranging from about 115 to about 300 microns as a friction reducer directly into a reservoir containing a fracture fluid prior to pumping the fracture fluid from the reservoir into a well bore formed in a subterranean formation, wherein the DWSP particles are dispersed in a fluid that does not dissolve the DWSP particles prior to the introduction into the reservoir, wherein the fluid that does not dissolve the DWSP particles is an oil; and
upon the introduction of the friction reducer, pumping the fracture fluid from the reservoir into the well bore formed in the subterranean formation to fracture the subterranean formation,
wherein a desired reduction in the pressure at the head of the well bore in the subterranean formation is achieved in less than about 30 seconds of pumping the fracture fluid,
wherein the micronized DWSP particles comprise:
a DWSP,
wherein the DWSP is selected from the group consisting of a dry anionic water soluble polymer, a dry cationic water soluble polymer, a dry nonionic water soluble polymer, and mixtures thereof.

2. The method of claim 1, wherein the fracture fluid includes at least one of water, brine, or liquid $CO_2$, and further comprising:
introducing a proppant into the fracture fluid.

3. The method of claim 2, wherein the fracture fluid includes the brine, and wherein the brine has a concentration ranging from about 2000 mg/l to about 350,000 mg/l.

4. The method of claim 1, wherein the mean particle size of the micronized DWSP particles ranges from about 135 microns to about 200 microns.

5. The method of claim 1, wherein the fracture fluid is selected from the group consisting of water, brine, liquid $CO_2$, and mixtures thereof.

6. The method of claim 1, wherein the mean particle size ranges from about 150 microns to about 200 microns.

7. The method of claim 1, wherein the micronized DWSP particles at least one of dissolve or disperse in a solution of water or brine in about 5 minutes or less.

8. The method of claim 1, wherein the micronized DWSP particles at least one of dissolve or disperse in a solution of water or brine in about 1 minute or less.

9. The method of claim 1, wherein the micronized DWSP particles further comprises an additive.

10. The method of claim 9, wherein an amount of the DWSP ranges from about 40 wt % to about 95 wt % of the micronized DWSP particles, and wherein an amount of the additive ranges from about 5 wt % to about 60 wt % of the micronized DWSP particles.

11. The method of claim 9, wherein the additive is selected from the group consisting of an inorganic oxide, an inorganic hydroxide, an inorganic salt, an organic salt, an insoluble water absorbing material, and mixtures thereof.

12. The method of claim 11, wherein the additive includes the inorganic oxide, and wherein the inorganic oxide is selected from the group consisting of calcium oxide, magnesium oxide, dolomite (CaO×MgO), and mixtures thereof, and
wherein the inorganic salt is selected from the group consisting of calcium chloride, magnesium chloride, and mixtures thereof.

13. The method of claim 11, wherein the additive includes the organic salt, and wherein the organic salt is selected from the group consisting of citrates, carbonates, bicarbonates, and mixtures thereof.

14. The method of claim 11, wherein the additive includes the insoluble water absorbing material, and wherein the insoluble water absorbing material is selected from the group consisting of silica gel, silica, alumina, and mixtures thereof.

15. The method of claim 11, wherein the additive includes the insoluble water absorbing material, and wherein the insoluble water absorbing material is selected from the group consisting of natural zeolite, synthetic zeolite, and mixtures thereof.

16. The method of claim 9, wherein the additive is an insoluble water absorbing material.

17. The method of claim 1, wherein the fracture fluid includes a brine, and wherein the brine has a concentration ranging from about 2000 mg/l to about 350,000 mg/l.

18. The method of claim 17, wherein the brine has a concentration ranging from about 200,000 mg/l to about 350,000 mg/l.

19. The method of claim 17, wherein the brine has a concentration ranging from about 250,000 mg/l to about 350,000 mg/l.

20. The method of claim 1, wherein the mean particle size ranges from about 135 microns to about 300 microns.

21. The method of claim 1, further comprising:
forming the dry water soluble polymer by polymerization of an acrylamide monomer, wherein an amount of acrylamide present in the water soluble polymer ranges from about 5 to about 100 mole percent.

22. The method of claim 1, wherein the dry water soluble polymer is polymerized from a dimethyl amino ethyl acrylate methyl chloride quaternary monomer, wherein an amount of dimethyl amino ethyl acrylate methyl chloride quaternary monomer present in the polymer ranges from about 5 to about 100 mole percent.

23. The method of claim 1, wherein the dry water soluble polymer is polymerized from an acrylic acid or an acrylic acid salt,
wherein the acrylic acid salt includes a counter ion selected from the group consisting of sodium, potassium, and ammonium, and mixtures thereof, and
wherein an amount of acrylic acid or acrylic acid salt present in the polymer ranges from about 2 to about 100 mole percent.

24. The method of claim 1, wherein the dry water soluble polymer is polymerized from ammonium methacrylate: 2-acrylamido-2-methylpropanesulfonic acid (AMPS) or an AMPS salt,
wherein the AMPS salt includes a counter ion selected from the group consisting of sodium, potassium, ammonium, and mixtures thereof, and
wherein an amount of AMPS or AMPS salt present in the polymer ranges from about 2 to about 100 mole percent.

* * * * *